R. F. GEIDE.
VEHICLE WHEEL RIM.
APPLICATION FILED NOV. 21, 1913.

1,089,634.

Patented Mar. 10, 1914.
2 SHEETS—SHEET 1.

Witnesses
Oscar V. Payne
V. J. Dowrick

Inventor
R. F. Geide
By Watson E. Coleman
Attorney

R. F. GEIDE.
VEHICLE WHEEL RIM.
APPLICATION FILED NOV. 21, 1913.
1,089,634.
Patented Mar. 10, 1914.
2 SHEETS—SHEET 2.
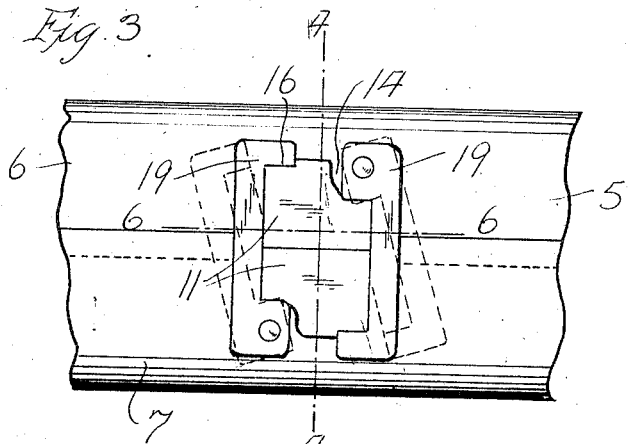
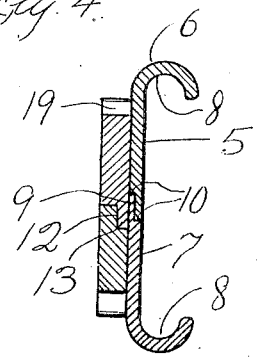
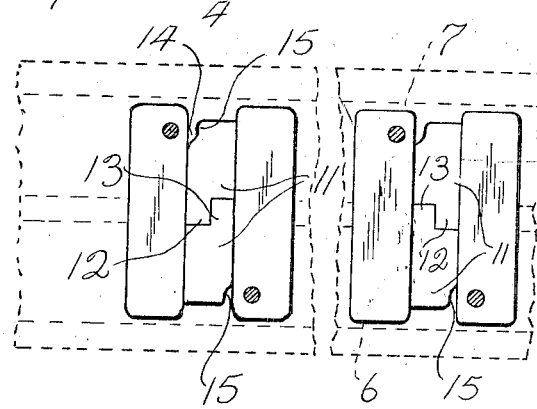
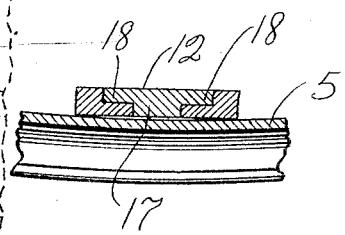
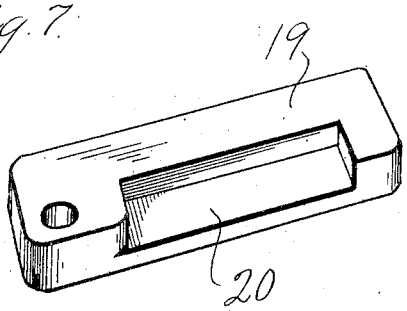
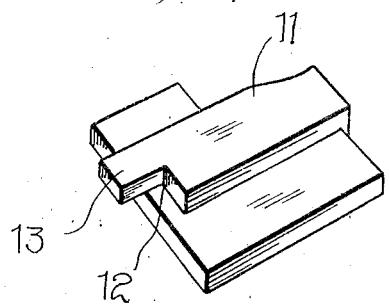
Witnesses
Oscar V. Payne
V. J. Dowrick
Inventor
R. F. Geide
By Watson E. Coleman
Attorney

UNITED STATES PATENT OFFICE.

RICHARD F. GEIDE, OF ROCHESTER, NEW YORK.

VEHICLE WHEEL-RIM.

1,089,634.

Specification of Letters Patent.  Patented Mar. 10, 1914.

Application filed November 21, 1913. Serial No. 802,235.

*To all whom it may concern:*

Be it known that I, RICHARD F. GEIDE, a citizen of the United States, residing at Rochester, in the county of Monroe and State of New York, have invented certain new and useful Improvements in Vehicle Wheel-Rims, of which the following is a specification, reference being had to the accompanying drawings.

This invention relates to new and useful improvements in vehicle wheel rims and more particularly to a sectional rim which is particularly adapted for use upon automobiles, the object of the invention being to provide a wheel rim formed in two side sections adapted to be securely locked together by improved and novel means of locking.

Another object of the invention is the provision of novel locking means which is adapted to be applied to the under face of the rim whereby the two sections of the rim may be securely locked together.

Another object of the invention is the provision of a device of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1:
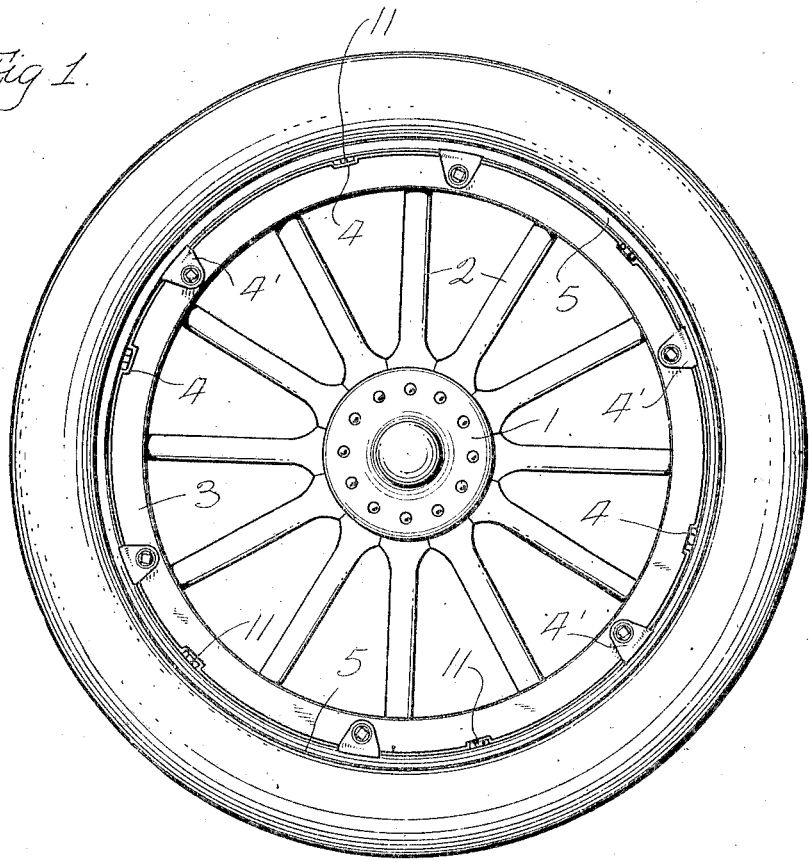
Figure 2:
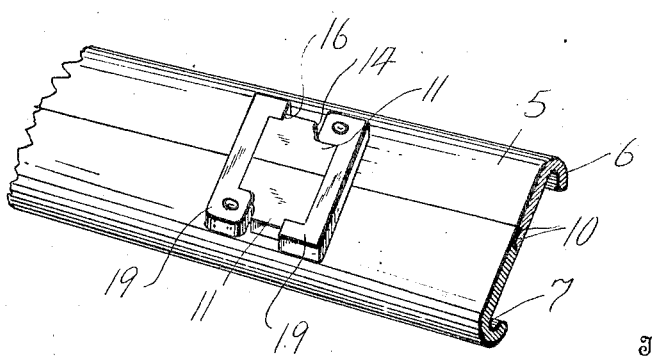

Figure 1 is a side elevation of an automobile wheel constructed in accordance with my invention; Fig. 2 is a detail perspective view illustrating my improved lock in its operative position; Fig. 3 is a bottom plan view of the lock; Fig. 4 is a transverse sectional view taken on the line 4—4 of Fig. 3; Fig. 5 is a top plan view; Fig. 6 is a longitudinal sectional view; Fig. 7 is a detail perspective view of one of the locking levers; and Fig. 8 is a detail perspective view of one of the blocks.

Referring more particularly to the drawings, 1 indicates the hub of the wheel from which project the radial spokes 2 connected at their outer ends by means of the felly 3 which constitutes the stationary rim of the vehicle wheel. The periphery of the felly 3 is provided with a plurality of spaced recesses, as indicated at 4, the purpose of which will be hereinafter more fully set forth. The numeral 5 indicates the detachable tire engaging rim which may be secured to the stationary felly 3 by means of the perforated ears 4' and is preferably formed in two side sections 6 and 7, the outer edges of each section being inwardly curved to form the usual channels 8 in which the beads of the tire are arranged. The inner longitudinal edge of one of said sections is provided in its upper face with a cut away portion 9, while the other section thereof is provided on its under face with a cut away portion, thus forming two overlapping tongues 10 which are adapted to be arranged within the cut away portions so that the two sections will fit tightly together.

Each of the sections 6 and 7 is provided upon its under face and at various intervals with suitable blocks 11, the blocks being provided upon the inner ends with oppositely disposed recesses 12 which form suitable tongues 13 adapted to fit within said recesses when the sections are arranged in position to prevent lateral movement of the blocks. From this it will be noted that when the two rim sections are brought together, the tongues 13 will be brought into parallel relation and will prevent any lateral movement of the blocks. The blocks are each provided at one corner with a large cut away portion 14, one face of which is provided with a curved surface 15 and the other corners of the blocks are provided with a small cut away portion, as indicated at 16, and are preferably arranged so that the recess upon one of the blocks will be arranged diametrically opposite the recesses on the other end of the block.

The blocks 11 each constitute an enlarged central portion 17 having outwardly extending flanges 18 in which the recesses are to be formed and pivotally connected to each of the sections is a locking lever 19, which is provided in one of its edges with a cut away portion 20 which is adapted to receive the outwardly extending flanges 18 of the blocks 11.

It will be apparent from the drawings that one end of each of the levers 19 is pivoted to the rim sections and arranged within the larger recesses 14 so that when the levers are arranged transversely across the rim sections, the free ends of the levers will be arranged within the smaller recesses 16, thus tightly clamping the two sections of the rim together.

It will be apparent from the accompanying drawings taken in connection with the description that when the two rim sections have been arranged in close relation and the pivoted levers 18 engaged with the ends of the blocks 11, the rim sections will be securely held against lateral or longitudinal movement.

It will also be apparent that I have provided simple and durable means for locking a sectional vehicle rim in position.

It will be understood that the blocks 11 may be either formed integral with the rim sections or they may be secured thereto in any suitable manner.

From the above description taken in connection with the accompanying drawings, it will be readily apparent that I have provided a simple and durable sectional rim for vehicles whereby the same may be quickly and readily applied to automobile wheels in use at the present time and the two sections thereof may be quickly locked together and securely held against movement. The device is extremely simple in construction and can be manufactured at comparatively low cost.

While I have shown and described the preferred form of my invention, it will be obvious that various changes in the details of construction and in the proportion may be resorted to for successfully carrying my invention into practice without sacrificing any of the novel features or departing from the scope of the appended claims.

What I claim is:—

1. A device of the class described including a sectional rim, blocks secured to each section of said rim and arranged at intervals at the inner longitudinal edges thereof, said blocks having outwardly extending flanges and provided with inset flanges with recesses, pivoted levers having their ends adapted to be arranged within said recesses and engage the ends of the flanges to retain said blocks in a locking position and hold the sections against movement.

2. A device of the class described including a sectional rim, blocks carried by each of said sections at the inner longitudinal edges thereof, outwardly extending flanges formed on said blocks and provided at the outer corners with large and small recesses, levers carried by said sections and having their pivoted ends arranged within the large recesses, and their other ends adapted to be arranged within the small recesses, said levers being provided with cut away portions to receive said flanges whereby the blocks will be locked against movement to retain said sections in position.

In testimony whereof I hereunto affix my signature in the presence of two witnesses.

RICHARD F. GEIDE.

Witnesses:
WILLIAM F. WATSON,
E. HIRSCHFIELD.